United States Patent [19]

Albaugh et al.

[11] Patent Number: 5,271,094

[45] Date of Patent: Dec. 14, 1993

[54] Z-BUFFER QUANTIZATION OF THREE-DIMENSIONAL LINES

[75] Inventors: Virgil A. Albaugh, Round Rock; Robert J. Urquhart, Austin, both of Tex.

[73] Assignee: International Business Machines Corporation, Armonk, N.Y.

[21] Appl. No.: 7,379

[22] Filed: Jan. 21, 1993

Related U.S. Application Data

[63] Continuation of Ser. No. 546,624, Jun. 29, 1990.

[51] Int. Cl.$^5$ .............................................. G06F 15/72
[52] U.S. Cl. ................................... 395/122; 395/143
[58] Field of Search ................ 395/122, 125, 143, 119

[56] References Cited

U.S. PATENT DOCUMENTS

| | | | |
|---|---|---|---|
| 4,625,289 | 11/1986 | Rockwood | 364/522 |
| 4,730,261 | 3/1988 | Smith | 364/521 |
| 4,791,581 | 12/1988 | Ohba | 395/125 |
| 4,808,986 | 2/1989 | Mansfield et al. | 340/747 |
| 4,841,292 | 6/1989 | Zeno | 340/736 |
| 4,845,651 | 7/1989 | Aizawa et al. | 364/522 |
| 4,855,934 | 8/1989 | Robinson | 364/521 |
| 4,855,938 | 8/1989 | Gonzalez-Lopez | 364/522 |
| 4,918,626 | 4/1990 | Watkins et al. | 364/522 |
| 4,985,855 | 1/1991 | Aldrich et al. | 395/125 |
| 5,084,830 | 1/1992 | Doornink et al. | 395/143 X |

OTHER PUBLICATIONS

IBM Technical Disclosure Bulletin, "Accelerated Bresenham Algorithm," S. K. Hoo, vol. 18, No. 4, Sep. 1975.

IBM Technical Disclosure Bulletin, "Generation of Points Using Bresenham's Algorithm," R. J. Llewelyn, A. M. Robins, vol. 20, No. 9, Feb. 1978.

Medical Information, "Pseudo-shading technique in the two-dimensional domain: a post-processing algorithm for enhancing the Z-buffer of a three dimensional binary image," A. C. Tan, R. Richards, vol. 14, No. 2, pp. 149-156, 1989.

Primary Examiner—Mark K. Zimmerman
Attorney, Agent, or Firm—Mark E. McBurney

[57] ABSTRACT

A method and apparatus is provided which allows a computer graphics system to accurately determine the actual depth value for pixels on a display screen which lie at the same depth as an associated surface. The associated surface is identified such that the delta z value with respect to the x and y direction along the surface can be calculated. The present invention then determines whether the line being considered is contained within a surface, or is an edge lying between, and adjacent to two surfaces. If the line is contained within a surface, the delta z value is initially added to the known endpoints of the line and then successively added, in the incremental x or y directions, to the pixels selected to represent the line. If the line is an edge, and includes selected pixels which lie on both associated surfaces, a filter is invoked that prevents those pixels corresponding to the surface, other than the surface first being considered, from being processed. The pixels being considered are then drawn in the same manner as a line within a surface. In this manner, the actual z value for each selected pixel can be determined and any hidden line, hidden surface removal problems are eliminated.

10 Claims, 5 Drawing Sheets

Z-BUFFER QUANTIZATION OF THREE-DIMENSIONAL LINES

This is a continuation of application Ser. No. 07/546,624 filed Jun. 29, 1990.

CROSS REFERENCE TO RELATED APPLICATION

U.S. patent application Ser. No. 07/439,902. filed Nov. 21. 1989. by G. Fossum and having the same assignee as the assignee of the present invention.

BACKGROUND OF THE INVENTION

In computer graphics processing systems and in particular those having three-dimensional or depth capability, lines are typically defined by the x,y,z, coordinates for two points lying therein. However, individual pixels (picture elements) which, when painted, constitute the line may not actually have coordinates which correspond to the line being drawn. Conventional methods exist to select those pixels which when painted best represent the characteristics of a line. Such methods include the Digital Differential Analyzer (DDA) and the Bresenham line draw algorithms.

However, a problem exists with the depth of the line with respect to the depth of a surface when lines are intended to lie near the same depth or in the same plane as a surface i.e. lines are drawn upon a surface. Problems also exist in displaying lines which are intended to lie near the same depth of an associated surface. This is true for lines which constitute edges or lie wholly within or upon a surface. Lines which are defined by the x,y,z, coordinates of two points and quantized by a z-buffer result in rasterized lines being incorrectly evaluated for visibility by a hidden line/hidden surface/removal z-buffer comparison (HLHSR comparison). As a z-buffer quantizes or determines the depth of a line for display, z-values (depth values) must be assigned to selected pixels which effectively determines the plane of the surface upon which the line is drawn. If the z-values for the lines are incorrectly assigned this line may exhibit undesirable characteristics. For example when the object or surface is rotated, the line contained thereon or an edge thereof may become dashed dotted or otherwise skewed to a viewer of the computer graphics system.

The hidden line/hidden surface/removal problem has been addressed a number of different ways. Existing solutions to this problem include shifting the depth (z-value) of the line within the z-buffer with respect to the surface such that the line is always perceived as being closer to a viewer. Additionally surface planes can be assumed from interpolated values, and z-values can be determined for points along the line by taking the partial derivative of z with respect to the x and y coordinate values of the line and assigning the z-value to the pixel selected nearest to the line. These conventional solutions are all lacking in any mathematical certainty and consistency because of the assumed definition of the surface. Therefore, it would be extremely advantageous to have a system which can determine the precise z-value for each pixel selected to represent a line, regardless of whether the line is an edge lying between polygons or a line contained within the surface. A precise definition of a surface is required such that a z-value of the pixels can be quantized relative thereto.

SUMMARY OF INVENTION

In contrast to the prior art, the present invention is a system which allows the graphics interface to thoroughly define the surface upon which the line may lie, by a method such as determining a normal thereto, or the like. The x,y,z, coordinates for the end points of the line are then identified and the pixels which will represent the line are selected by a manner such as the DDA. Bresenham algorithm, or the like. Calculations are then performed for the pixels of the surface associated with the line by taking the partial derivative of the z-value of the line with respect to the x (dz/dx) and y (dz/dy) coordinate values of the surface. It is then determined whether the line, associated with the surface, is an edge (associated with two surfaces) or completely contained within the boundaries of a single surface.

If the line is not an edge, the actual z-value of the pixels selected to represent the line is calculated by adding the change for each z-value (delta z) of the line points in the x,y direction (dz/dx and dz/dy) to a selected pixel for which the z-value is known.

However, if the line is an edge. i.e. lies between and adjacent to two surfaces, or polygons, then a filter is utilized which will allow only those pixels selected for the line, which lie within the surface being considered, to be processed. That is, those pixels associated with the other surface are not processed until that surface is identified. In affect the edges are drawn twice, once for each associated surface. Subsequent to the edges being drawn, the actual z-values of the selected pixels are calculated as previously discussed. Should the z-values used for a line and surface be determined to be at the same depth, a user of a computer graphics system can decide whether a line or surface is to take precedence and be visible to a user of the system, i.e. whether the line or surface will be hidden.

Consequently with the exact z-values known for all the lines and images, the surfaces and corresponding lines can be displayed without any degradation in performance which often occurs when a displayed image is rotated, or otherwise altered by a user.

Therefore in accordance with the previous summary, objects, features, and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
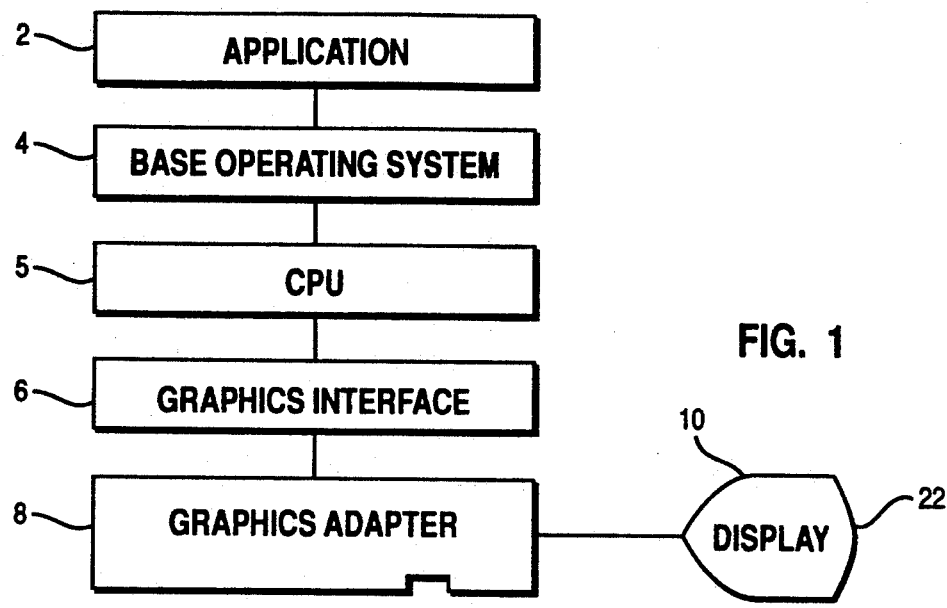
FIG. 1 is a schematic diagram of a representative system which can take advantage of the present invention.

Referring to FIG. 1, a system capable of utilizing the present invention is shown wherein a program application 2, such as graPHIGS and the base operating system such as AIX (AIX and graPHIGS are trademarks of IBM Corporation) are shown. Additionally, a central processing unit (CPU) 5, a graphics interface 6, graphics adapter 8 and display 10 having a screen 22 are included in the system of FIG. 1. Display 10 may be a cathode ray tube (CRT) having a screen containing a plurality of pixels thereon capable of being painted or colored by an electron beam. It should be noted that the present invention is not limited to the system of FIG. 1, but may be implemented on a plurality of configurations. For example, the graphics adapter 8 may contain a physical z-buffer, or depth buffer, which stores the perceived depth value for each pixel. Alternatively, a portion of system memory can be utilized by application 2 to create a software version of a z-buffer. Further, the present invention is capable of being used on a virtual terminal system. Therefore, it can be seen that the present invention is not limited to specific systems, but is useful for many types of computer graphics configurations.

The process utilized by the present invention will now be described with reference to FIGS. 2A and 2B. At step 1, the process starts and at step 2 the application 2 identifies, or defines the surface which is to be associated, or is co-planar with a line. It should be noted that associated lines and surfaces include lines which are to be drawn proximate, or near the same depth as the surface. Surface identification may be accomplished by a number of methods including taking the cross product of two surface edges (or lines contained thereon), in order to obtain the normal vector to the surface. The end points of the line contained within the surface, or associated therewith as an edge, are then identified at step 3. This line identification is accomplished by taking the x,y,z (cartesian) coordinates for the end points of the line. Due to the fact that the screen 22 of display 10 may contain pixels which are not linearly arranged identically for the line desired to be drawn (see FIG. 3). a means of selecting pixels closest to the line must be implemented. One such method of pixel selection that may be used in step 4 is the Bresenham algorithm, which is derived from the line equation y=mx+b. This algorithm finds the closest integer coordinates to the actual line to be drawn. In the context of a computer graphics system, the Bresenham algorithm determines which pixels are closest to the line being drawn.

Figure 4:
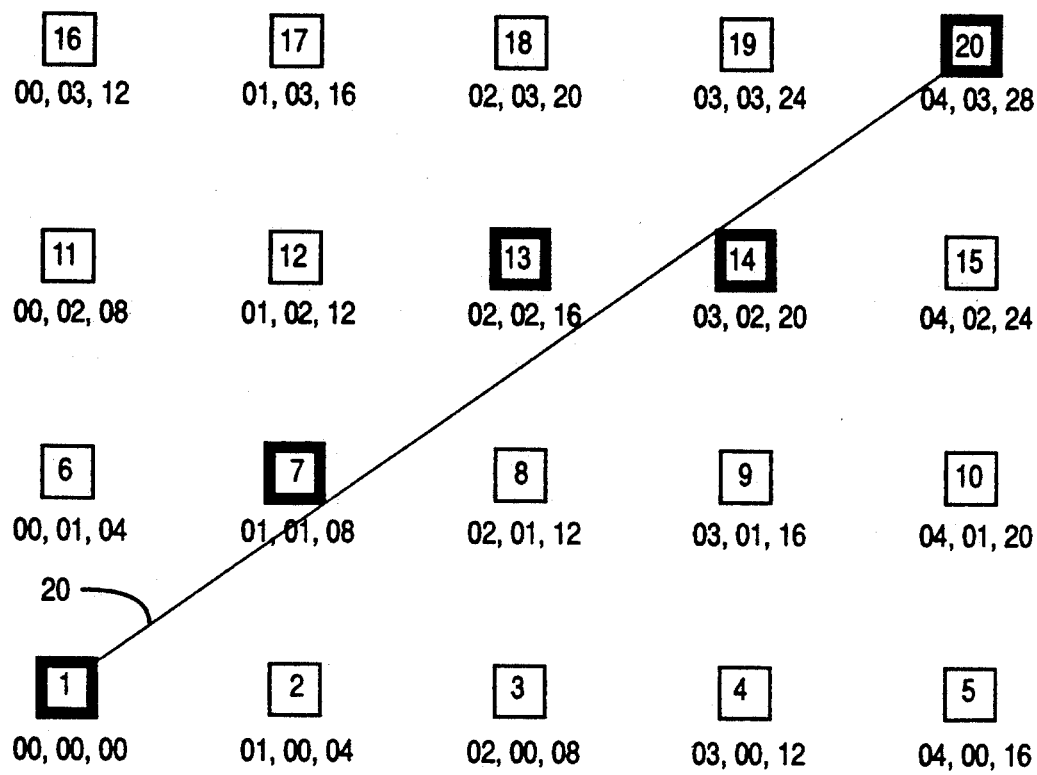
FIG. 4 is an illustration of a portion of the pixels on the surface of FIG. 3 and includes the pixels selected to represent a line, having a positive slope less than one.

In particular, the slope of the line is first considered and if positive and less than one, such as shown by the line 20 of screen 22 in FIG. 4, then the algorithm takes incremental steps horizontally along the x axis and considers those pixels on either side of the line having the same x value as the incremental steps along the x axis. In considering the two pixels adjacent and on either side of the line, the individual pixel closest to the line being drawn is selected to represent the line. This selection is made by calculating and comparing the differences in distance between each pixel and the y intercept of the line to be drawn.

For example, in FIG. 4, the line 20 is drawn from pixels 1 to 20. Line 20 has a positive slope less than one. The Bresenham algorithm initially steps to pixel 2 and then looks at the two pixels 7, 2 on either side of line 20. Since the distance from line 20 to pixel 7 is less than the distance from line 20 to pixel 2, pixel 7 is selected to represent line 20. Next, the algorithm continues to pixel 3 and considers pixels 8 and 13. Pixel 13 is selected since it is closer to line 20. Finally, the Bresenham line draw algorithm incrementally steps to pixel 4 and considers pixels 14 and 19. Pixel 14 is chosen since it is closer to line 20 than pixel 19. In this manner, the pixels 7, 13, and 14 were selected to represent line 20 by application of the Bresenham algorithm.

Figure 5:
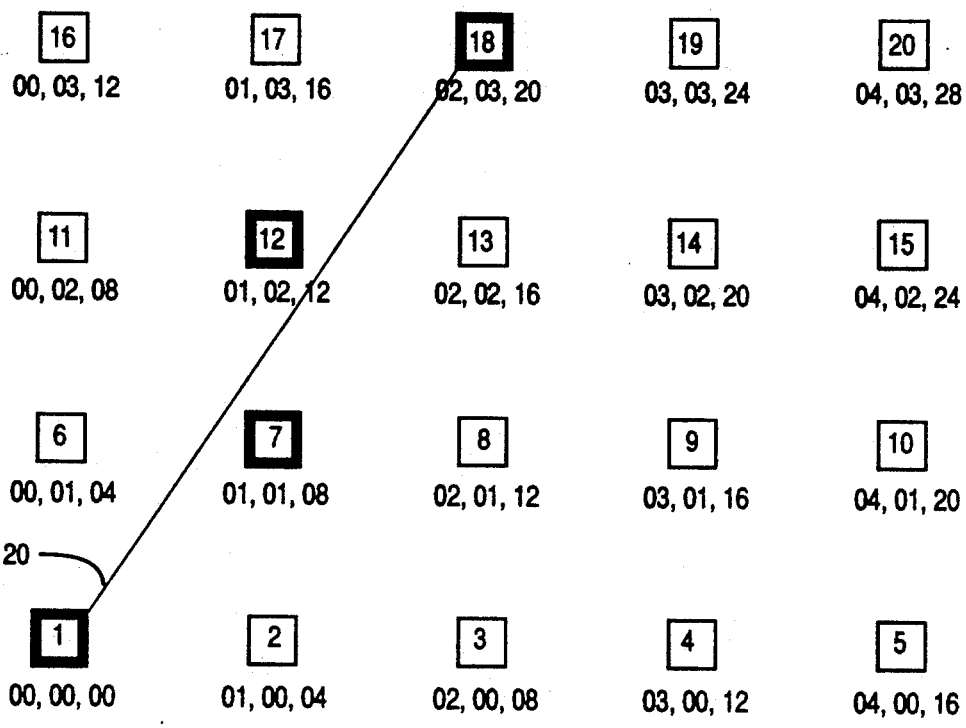
FIG. 5 is an illustration of the pixels shown on a display screen and includes pixels selected to represent a line having a positive slope greater than one.

Similarly, a line 21 having a positive slope greater than one is shown in FIG. 5. In the case where the slope is greater than one, the Bresenham algorithm steps vertically along pixels on the y axis and considers those two pixels on either side of the line having the same y value as those pixels incrementally stepped to along the y axis. The difference in distance from the two pixels adjacent and on either side of line 21 are compared and the pixel closest to the line being drawn is selected. In this case the x intercept of line 21 is used to determine which pixel is closest. For example, considering line 21 of FIG. 5, the Bresenham algorithm would initially step to pixel 6 and consider pixels 6, 7 and select pixel 7 to represent line 21 since it is closer thereto. Next, the algorithm steps to pixel 11 and considers pixels 12, 13 before selecting pixel 12 because it is closer to line 21. Thus pixels 12 and 7 have been selected to represent line 21 by application of the Bresenham algorithm. It should be noted that the Bresenham line draw algorithm, as described above, applies to lines having negative slopes, as well since the basic steps remain unchanged. That is, the algorithm steps along the x axis for slopes less than negative one and steps along the y axis for slopes greater than negative one, and considers the corresponding pixels adjacent either side of the line being drawn. The stepping portion of this algorithm may occur in a negative direction. For example, in processing a line contained in the fourth quadrant, the algorithm would step in a negative direction along the y axis and in a positive direction along the x axis. It can be seen from FIGS. 4 and 5, that for those lines having a slope equal to one, or a negative one, the Bresenham algorithm is not required since the line lies directly on those pixels which can be used to best represent the line.

Further, the Bresenham line draw algorithm is capable of generating a bias error term, or parameter which compares the relative differences in distance between each adjacent pixel and the line. By calculating this parameter, the determination of which pixel lies closest to the line becomes a matter of determining whether the sign of the parameter is positive or negative. This parameter compares the distances between the two pixels adjacent and on either side of the line such that the smaller distance, and corresponding closest pixel is indicated by a parameter having a negative sign. Additionally, once the first parameter is calculated, incremental parameters can be calculated as the algorithm incrementally steps along the x or y axis, as discussed above. Thus, determining which pixels are closest to a line becomes a matter of looking at the sign of one adjacent to the line being drawn. For example, if the parameter for a given pixel has a negative value, then it is closest to the line and selected. However, if the parameter value is positive then the other (negative) pixel is automatically selected as being closest to the line. Therefore, by utilizing the Bresenham algorithm, selection of those pixels closest to the line being drawn can be reduced to an exercise of determining whether a parameter term is positive or negative.

Figure 2A:
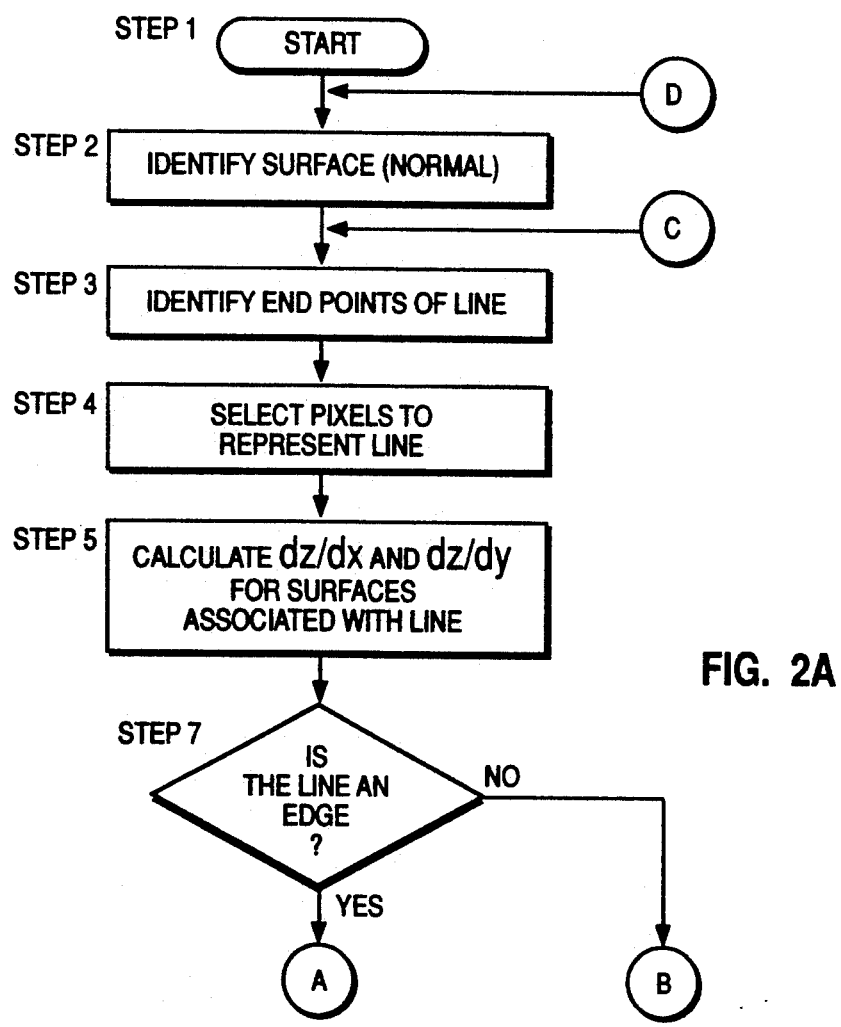
FIGS. 2a and 2b are flowcharts illustrating the process by which the present invention is capable of determining the actual z values for pixels selected to represent a line associated with a surface.
Figure 2B:
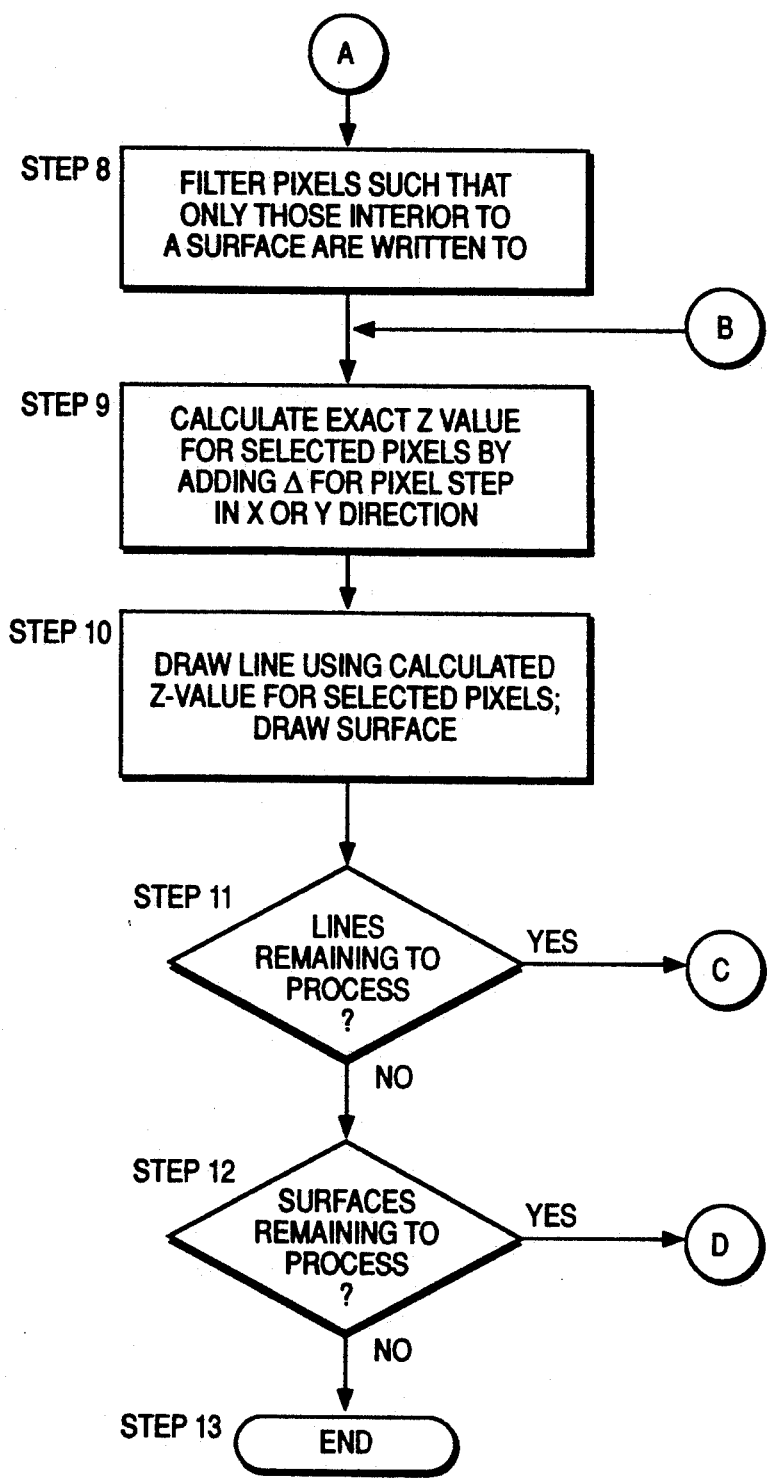
Figure 3:
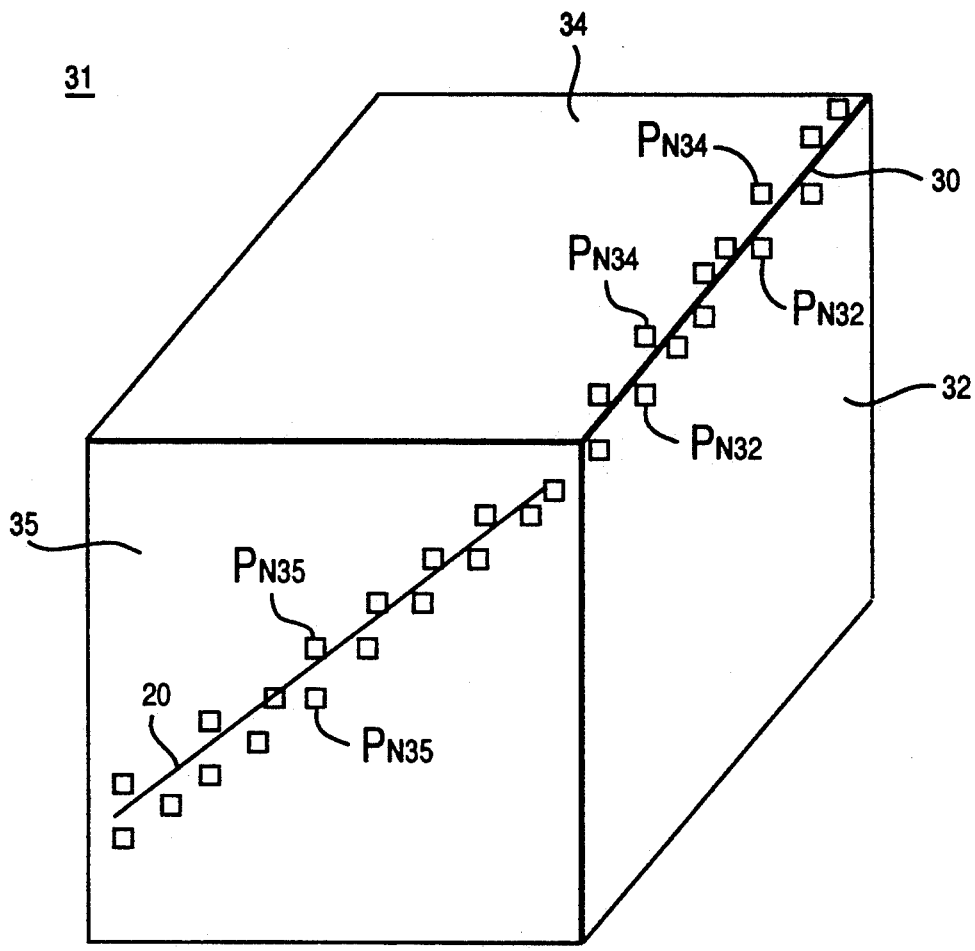
FIG. 3 is a perspective diagram of an image showing specific surfaces and a line associated therewith, as well as lines contained within a single surface, each line being represented by a plurality of pixels.
Figure 6:
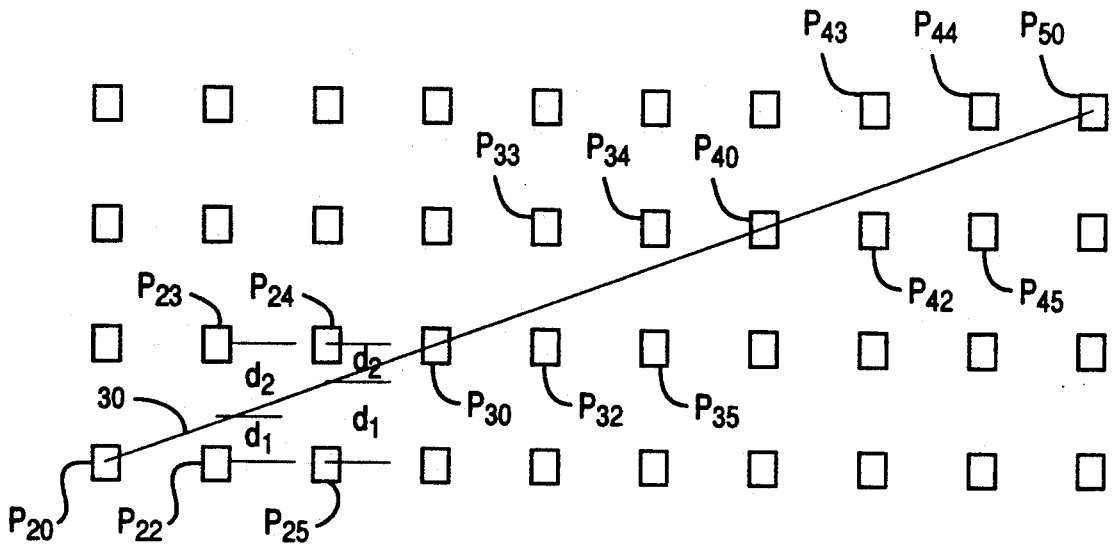
FIG. 6 is a diagram showing how the error term can be determined from a corresponding group of selected pixels for filtering those pixels not associated with a specific surface from consideration during processing of an edge.

At step 5, of FIG. 2A the partial derivatives of the z-value with respect to the x and y coordinates of the associated surface are computed such that a delta z-value with respect to x and y coordinate increments for the pixels lying on the surface is determined. Further, this computation allows the z-value for each pixel of the surface to be accurately determined. Whether the line is an edge (with two associated surfaces) or a line completely contained by a surface is determined at step 7. This determination is made by comparing the drawing instructions sent from application 2 to graphics adapter 8. For example, a line may be defined as a pair of points, whereas an edge is typically described as the side of a polygon. Further, an edge may be defined by the application as four corner points of a polygon. It can be seen that a program application will describe a line to be drawn in a manner different from edges, such that the present invention can differentiate therebetween. If the line is an edge, then a filter is invoked such that only those pixels associated with a first surface can be drawn (FIGS. 3 and 6). This step is required since the partial derivative of z with respect to the x and y coordinates is only valid for those pixels, representing the edge, which are interior and thus contained within their associated surface. Therefore, only these pixels should be evaluated with respect to the surface on which they lie. The filter is then invoked to allow pixels lying within the second associated surface to be drawn using the x and y coordinates of this second surface in order to determine the z-values for these pixels. In this manner, the z-values for the selected pixels are always calculated with respect to the actual associated surface.

In order to filter the pixels from the associated surface, which is not presently being considered, an extension of the Bresenham line draw algorithm can be utilized. The Bresenham error term can be used to determine which side of the line the pixels are on. A test to determine whether a pixel lies interior to a surface becomes the test of whether the Bresenham error term crosses the midpoint of the line. This process can be further simplified if a bias error term is developed along with the Bresenham error term. In this situation, the interior/exterior test merely becomes a sign, i.e. positive or negative, test between the bias error term and the Bresenham error term.

Referring to FIG. 3 an image 31 such as a cube, or the like is shown. Cube 31 includes surfaces, or polygons. 32. 34 having a line 30 lying therebetween. Pixels Pn32 and Pn34 are shown which have previously been selected through a line draw algorithm method, such as the DDA. or Bresenham method. It can be seen that pixels Pn34 are associated with surface 34 and pixels Pn32 with surface 32. In order to correctly determine the z value for these pixels, they must be drawn with an associated surface. The flow chart of FIG. 2A (step 7) determines that line 30 is an edge and step 8 invokes the filter mechanism of the present invention, which will now be described. Additionally, a line 20 is shown which is contained on the surface 35 of cube 31 and represented by pixels Pn35. Thus, FIG. 3 illustrates an edge and its two associated surfaces (line 30 and surfaces 32 and 34) and a line completely contained within a surface (line 20 and surface 35).

For the purposes of describing the operation of this filter, assume the slope of line 30 to be one-third (1/3). FIG. 6 shows line 30 of FIG. 3 in greater detail, e.g. with a ⅓ slope and associated pixels which were selected by a line draw algorithm. Applying the Bresenham algorithm, as previously discussed, it can be seen that, pixels p20, p22, p24, p30, p32, p34, p40, p42, p44 and p50 will be selected. Additionally, it should be noted that pixels p20, p30, p40 and p50 lie exactly on the edge 30 being displayed, thus having an error term (E) equal to zero. For the remaining pixels, the error term must be determined by subtracting the differential y value with respect to a first pixel on one side of the line and closest to the line, e.g d1, from the differential y value with respect to the pixel closest to the line and lying on the opposite side of the line from the first pixel, e.g. d2. This difference is then multiplied by the incremental change in the x value (delta x). i.e. E=delta x (d1−d2).

For example, consider pixels p22 and p23 of FIG. 6, where d1=⅓, d2=⅔ and delta x=1. In this case the error term (E) for the selected line pixel 22 can be determined as follows, E22=1(⅓−⅔) =−⅓. Similarly, stepping across to pixels p24 and p25, where d1=⅔ and d2=⅓, E24=1(⅔−⅓) =⅓. At pixel 30 the differential y values are equal to zero, therefore, the error term (E24) will be equal to zero indicating that pixel p30 is exactly on the line 30. Continuing with this example it can be seen that selected line pixels p32. p42 will have an error term of −⅓, since the calculation will be identical to those above with reference to p22. Further, selected line pixels p34. p44 will have an error term equal to ⅓, as discussed above, with reference to p24.

Based upon this description, it can be seen how selected pixels p22, p32, p42 all have a negative sign and all lie on the same side of line 30, whereas pixels p24. p34 p44 each have a positive sign and lie on the other side of line 30. Relating the previous discussion to the polygon 31 of FIG. 3, pixels p22, p32, p42 may be those associated with surface 32 and pixels p24, p34 and p44 may correspond to those pixels associated with surface 34. In this manner, by merely determining the sign of the error term generated by a Bresenham line draw algorithm, a filter can be invoked which allows only those pixels representing a particular line and associated with a particular surface to be considered when determining their actual z value.

For example, referring to FIG. 3, line 30 is an edge lying between and adjacent to surfaces 32 and 34. By invoking the described filter, pixels Pn34 associated with a first surface 34 are not considered during processing of the pixels Pn32 selected to represent line 30, which lie interior to surface 32. That is, pixels Pn34 on the left of line 30 and contained within surface 34 are filtered while the pixels Pn32 on the right of line 30 are being drawn. Likewise, pixels Pn32 are filtered during processing of pixels Pn34. Thus, the present invention ensures that only those pixels associated with a particular surface are considered during the process wherein the actual z value, for the pixels representing the line, is determined. It should be noted that pixels lying exactly on the edge itself may be considered to be associated with either surface, since, for the purposes of calculating the z value, it does not matter which surface is the associated one.

At step 9 the actual z value for the selected pixels can then be calculated by adding the delta z values for each incremental step between pixels in the x or y direction to the z-value of a known selected pixel. That is, referring to FIG. 6, for p22 the partial derivative in the z direction with respect to the x direction is added to the z value for p20 (which is known since p20 is an endpoint and the x,y,z coordinates are known for the endpoints of a line) and the actual z value for pixel p22 is determined. Similarly, the partial of z with respect to x for the x increment between p22 and p24 is added to the previous z value for p22 in order to determine the actual z value at pixel p24. For p30, the partial of z with respect to x for the x increment between p24 and p30 is added to p24, and the partial of z with respect to y for the increment from p20 (y value) to p30 (y value) is added to p24. In this manner, the delta z (dz/dy) between p20 and p30, in the y direction, and the cumulative delta z (dz/dx) from p20 to p30, in the x direction, are used to determine the actual z value at p30. An identical process to that just described is then applied to pixels p32, p34, p40, p42, p44 and p50 to determine the exact z values for pixels selected to represent a line. It should be noted that the implementation of step 9 is utilized regardless of whether the selected pixels represent an edge, or a line contained within a surface. Further, the partial derivatives utilized by step 9, i.e. dz/dx and dz/dy, have been previously calculated at step 5. Thus, step 9 becomes a matter of summing previously calculated partial derivatives. The previous description describes a line with a one-third slope, wherein three incremental steps are taken along the x direction for each incremental step in the y direction. However, this discussion is not limited in any way to a line with a specific slope, but will apply to pixels representing a line with any slope.

The line and surfaces are then drawn at step 10, the z values being utilized for the lines and edges are those previously determined, and step 11 determines whether there are any lines remaining to be processed. If so, the process returns to step 3 and the end points are identified in the manner as previously described. It should be noted that an edge will require two loops through the process in order to draw the line (edge) for each of the two associated surfaces. i.e. at step 12 it will be determined that the other surface adjacent to the edge must be processed and the present invention will return to step 2. If it is determined that no lines are remaining to be processed, the present invention then determines if any surfaces are remaining and if so returns to step 2. However, if at step 12 there are no surfaces remaining the process of the present invention then ends at step 13.

Therefore, in accordance with the previous description, it can be seen how an accurate calculation of the z, or depth value for each pixel representative of a line will solve any hidden line, hidden surface problems associated with surfaces having corresponding lines, or edges with a z value at, or near the depth of the surface.

Although certain preferred embodiments have been shown and described, it should be understood that many changes and modifications may be made therein without departing from the scope of the appended claims.

What is claimed is:

1. A computer graphics system including a central processing unit, for displaying at least one image including at least one edge intermediate adjacent first and second surfaces, comprising:
   means for selecting pixels associated with said first and second surfaces to represent said edge;
   means for computing, on said central processing unit, delta z values for said selected pixels, based upon incremental x and y values between said selected pixels;
   means for filtering said selected pixels such that only the selected pixels associated with a respective one of said first or second surface, that is being drawn, will be processed;
   means for adding said delta z values, corresponding to the incremental x and y values, to a known z value for one of said selected pixels to determine the z values for each of the selected pixels wherein said z value is based on a computed depth of said edge and may be different form the remainder of the pixels associated with said first and second surfaces; and
   means for drawing said selected pixels, at said determined z values.

2. A system according to claim 1 further comprising means for displaying said at least one edge and said first and second surfaces on said computer graphics system.

3. A system according to claim 2 wherein said means for selecting comprises:
   means for providing endpoints for said edge in cartesian coordinates;
   means for determining a pixel lying closest to a straight line connecting said endpoint, for lines having a slope of less than one, by comparing a y direction distance, from said line to adjacent pixels on opposite sides of said line; and
   means for determining a pixel lying closest to said edge, for edges having a slope of greater than one, by comparing an x direction distance, from said edge to adjacent pixels on opposite sides of said edge.

4. A system according to claim 3 wherein said means for computing comprises:
   means for calculating a partial derivative in a z direction with respect to the x direction; and
   means for calculating a partial derivative in a direction with respect to the y direction.

5. A system according to claim 12 wherein said means for filtering comprises:
   means for computing an error term based upon the distance from said selected pixels to said line, said selected pixels having a positive error term being on a first side of said line, and said selected pixels having a negative error term being on the other side of said line.

6. A method of displaying on a computer graphics system, including a central processing unit at least one image including at least one edge intermediate adjacent first and second surfaces, comprising:
   selected pixels associated with said first and second surfaces to represent said edge;
   computing, on said central processing unit, delta z values for said selected pixels, based upon incremental x and y values between said selected pixels;
   filtering said selected pixels such that only the selected pixels associated with a respective one of said first or second surface, that is being drawn, will be processed;
   adding said delta z values, corresponding to the incremental x and y values, to a known z value for one of said selected pixels to determine the z values for each of the selected pixels wherein said z value is based on a computed depth of said edge and may be different from the remainder of the pixels associated with said first and second surfaces; and drawing said selected pixels, at said determined z values.

7. A method according to claim 6 further comprising the step of:
displaying said at least one edge and said first and second surfaces on said computer graphics system.

8. A method according to claim 7 wherein said step of selecting comprises the steps of:
providing endpoints for said edge in cartesian coordinates;
determining a pixel lying closest to a straight line connecting said endpoints for said edge in cartesian coordinates;
determining a pixel lying closest to a straight line connecting said endpoints, for lines having a slope of less than one, by comparing a y direction distance, from said line to adjacent pixels on opposite sides of said line; and
determining a pixel lying closest to said line for lines having a slope of greater than one, by comparing an x direction distance, from said line to adjacent pixels on opposite sides of said line.

9. A method according to claim 8 wherein said step of computing comprises the steps of:
calculating a partial derivative in a z direction with respect to the x direction; and
calculating a partial derivative in a z direction with respect to the y direction.

10. A method according to claim 9 wherein said step of filtering comprises:
computing an error term based upon the distance from said selected pixels to said line, said selected pixels having a positive error term being on a first side of said line, and said selected pixels having a negative error term being on the other side of said line.

* * * * *